US009609498B2

(12) United States Patent
Suh et al.

(10) Patent No.: US 9,609,498 B2
(45) Date of Patent: Mar. 28, 2017

(54) SECURITY CONTROL METHOD AND DEVICE IN A MOBILE COMMUNICATION SYSTEM SUPPORTING EMERGENCY CALLS, AND A SYSTEM THEREFOR

(75) Inventors: Kyung-Joo Suh, Seoul (KR); Jae-Chon Yu, Suwon-si (KR); Seung-Hoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/806,434

(22) PCT Filed: Jun. 21, 2011

(86) PCT No.: PCT/KR2011/004532
§ 371 (c)(1),
(2), (4) Date: Dec. 21, 2012

(87) PCT Pub. No.: WO2011/162538
PCT Pub. Date: Dec. 29, 2011

(65) Prior Publication Data
US 2013/0102270 A1    Apr. 25, 2013

(30) Foreign Application Priority Data
Jun. 21, 2010  (KR) .......................... 10-2010-0058483

(51) Int. Cl.
*H04M 11/04*      (2006.01)
*H04W 4/22*       (2009.01)
(Continued)

(52) U.S. Cl.
CPC .............. *H04W 4/22* (2013.01); *H04W 12/00* (2013.01); *H04W 12/02* (2013.01); *H04W 76/007* (2013.01); *H04W 36/14* (2013.01)

(58) Field of Classification Search
CPC ................................ H04W 4/22; H04W 12/00
(Continued)

(56) References Cited

U.S. PATENT DOCUMENTS 7,085,567 B1 *   8/2006  Rajaniemi ............. H04L 63/126
                                                  379/188
8,072,936 B2 *  12/2011  Shaheen ........... H04W 36/0061
                                                  370/331
(Continued)

FOREIGN PATENT DOCUMENTS

KR   10-2008-0109236 A   12/2008
KR   10-2010-0021385 A    2/2010
(Continued)

*Primary Examiner* — Steve D Agosta
(74) *Attorney, Agent, or Firm* — Jefferson IP Law, LLP (57) ABSTRACT

The present invention relates to a security control method and device for emergency calls in a mobile communication system, and the security control method in a mobile communication system supporting emergency calls according to an embodiment of the present invention comprises: a step in which a terminal transmits a message containing terminal security capabilities to a source network during handover in an emergency call; a step in which a mobility manager of the source network transmits, to a mobility manager of a target network, the message containing terminal security capabilities; a step in which the mobility manager of the target network transmits, to a base station of the target network, a hand-over request message containing the terminal security capabilities; and a step in which, after the hand-over preparation procedure has been completed, a base station of the source network transmits, to the terminal, a hand-over command message containing the terminal security capabilities.

6 Claims, 9 Drawing Sheets

(51) Int. Cl.
*H04W 76/00* (2009.01)
*H04W 12/00* (2009.01)
*H04W 12/02* (2009.01)
*H04W 36/14* (2009.01)

(58) Field of Classification Search
USPC .................................................. 455/404.1
See application file for complete search history.

(56) References Cited

U.S. PATENT DOCUMENTS

| | | | |
|---|---|---|---|
| 8,681,739 B1 * | 3/2014 | Zhao | H04W 8/085 370/328 |
| 2002/0191556 A1 * | 12/2002 | Krishnarajah | H04W 28/06 370/329 |
| 2005/0037753 A1 * | 2/2005 | Andersen | H04W 48/18 455/435.2 |
| 2006/0276168 A1 * | 12/2006 | Fuller, Jr. | H04M 11/04 455/404.2 |
| 2008/0316971 A1 * | 12/2008 | Shaheen | H04W 36/0033 370/331 |
| 2008/0316972 A1 * | 12/2008 | Shaheen | H04W 36/0033 370/331 |
| 2009/0016300 A1 * | 1/2009 | Ahmavaara | H04W 36/0072 370/331 |
| 2009/0036131 A1 * | 2/2009 | Diachina | H04W 36/0022 455/436 |
| 2009/0209259 A1 * | 8/2009 | Brusilovsky | H04W 12/04 455/438 |
| 2009/0258631 A1 * | 10/2009 | Forsberg | H04L 63/08 455/411 |
| 2009/0268687 A1 * | 10/2009 | Lee | H04L 1/1809 370/331 |
| 2010/0115275 A1 | 5/2010 | Suh et al. | |
| 2010/0167755 A1 * | 7/2010 | Kim | H04W 48/18 455/456.1 |
| 2010/0261473 A1 * | 10/2010 | Al-Bakri | H04W 8/02 455/435.2 |
| 2010/0266107 A1 * | 10/2010 | Brusilovsky | H04W 4/22 379/46 |
| 2010/0293372 A1 * | 11/2010 | Fischer | H04W 12/06 713/168 |
| 2011/0142239 A1 | 6/2011 | Suh et al. | |
| 2011/0176510 A1 * | 7/2011 | Hallenstal | H04W 36/0022 370/331 |
| 2012/0039464 A1 * | 2/2012 | Xu | H04L 63/205 380/28 |
| 2012/0057568 A1 * | 3/2012 | Lim | H04W 4/22 370/331 |

FOREIGN PATENT DOCUMENTS

| | | |
|---|---|---|
| KR | 10-2010-0053418 A | 5/2010 |
| KR | 10-2010-0054178 | 5/2010 |
| WO | 2008/100490 A1 | 8/2008 |

* cited by examiner

SECURITY CONTROL METHOD AND DEVICE IN A MOBILE COMMUNICATION SYSTEM SUPPORTING EMERGENCY CALLS, AND A SYSTEM THEREFOR

PRIORITY

This application is a U.S. National Stage application under 35 U.S.C. §371 of an International application filed on Jun. 21, 2011 and assigned application number PCT/KR2011/004532, which claims the benefit of a Korean Application Serial No. 10-2010-0058483, which was filed in the Korean Intellectual Property Office on Jun. 21, 2010, the entire contents of which are hereby incorporated by reference.

TECHNICAL FIELD

The present invention relates to a method and apparatus for managing emergency calls in a mobile communication system, and more particularly, to a method and apparatus for managing security for emergency calls in a mobile communication system.

BACKGROUND ART

One of major standardization organizations for mobile communication, the $3^{rd}$ Generation Partnership Project (3GPP) has defined an Evolved Packet System (EPS) and has introduced a Mobility Management Entity (MME) as a network mobility management entity, for future-generation communication. Techniques for providing high-speed communication services by improving a protocol used in a legacy communication system, for example, the 3GPP Non-Access Stratum (NAS) protocol used for 3 G communications in relation to security management were proposed for the future-generation mobile communication system. The proposed security management techniques involve enhanced security management such as performing security mode by introducing the concept of a NAS protocol capable of reinforcing security to the NAS layer, in addition to conventional authentication and security control performed in the NAS layer.

However, NAS protocol-based security management techniques proposed so far have specified no appropriate security procedures for authentication and security reinforcement in support of emergency calls or handover of emergency calls. As a result, it is highly probable that security is not ensured or communication is interrupted during handover of an emergency call. Accordingly, there exists a need for a method for seamlessly supporting authentication, security, and communication between a terminal and a network even during handover in an emergency call situation.

DISCLOSURE

Technical Problem

An aspect of embodiments of the present invention is to provide a method and apparatus for managing security to support seamless communication and a system therefor in a mobile communication system supporting emergency calls.

Another aspect of embodiments of the present invention is to provide a method and apparatus for managing security during handover of an emergency call and a system therefor in a mobile communication system.

A further aspect of embodiments of the present invention is to provide a method and apparatus for managing security to support an emergency call in the event of authentication failure of a terminal and a system therefor in a mobile communication system.

Technical Solution

In accordance with an embodiment of the present invention, there is provided a method for managing security in a mobile communication system supporting emergency calls, in which a message including a User Equipment (UE) security capability is transmitted to a source network by a UE, when the UE performs handover during an emergency call, a message including the UE security capability is transmitted to a mobility manager of a target network by a mobility manager of the source network, a handover request message including the UE security capability is transmitted to a Base Station (BS) of the target network by the mobility manager of the target network, and a handover command message including the UE security capability is transmitted to the UE by a BS of the source network, after a handover preparation procedure is completed.

In accordance with another embodiment of the present invention, there is provided a mobile communication system supporting emergency calls, in which a UE transmits a message including a UE security capability to a source network, when the UE performs handover during an emergency call, a mobility manager of the source network transmits a message including the UE security capability to a mobility manager of a target network, the mobility manager of the target network transmits a handover request message including the UE security capability to a BS of the target network, and a BS of the source network transmits a handover command message including the UE security capability to the UE, after the handover preparation procedure is completed.

In accordance with another embodiment of the present invention, there is provided a method for managing security at a UE in a mobile communication system supporting emergency calls, in which a message including a UE security capability is transmitted to a source network, when the UE performs handover during an emergency call, and a handover command message including the UE security capability is received from the source network, after a handover preparation procedure is completed between the source network and a target network.

In accordance with a further embodiment of the present invention, there is provided a method for managing security at a mobility manager of a target network in a mobile communication system supporting emergency calls, in which a message including a UE security capability is received from a UE through a mobility manager of a source network, when the UE performs handover during an emergency call, a handover request message including the UE security capability is transmitted to a BS of the target network, and a handover request acknowledgment message is received from the BS of the target network.

Advantageous Effects

According to the present invention, an authentication operation and a security-mode operation can be performed reliably and the mobility of a terminal can be efficiently managed, during an emergency call or during handover of an emergency call.

BEST MODE TO CARRY OUT THE INVENTION

Reference will be made to preferred embodiments of the present invention with reference to the attached drawings. A detailed description of a generally known function and structure of the present invention will be avoided lest it should obscure the subject matter of the present invention. The terms used in the present invention are defined, taking into account functions in the present invention and may be changed according to the intention of a user or an operator, or customs. Therefore, the present invention must be understood, not simply by the actual terms used but by the meanings of each term lying within.

Embodiments of the present invention as described later provide efficient security management methods for managing and supporting authentication of a terminal and the security of a Non Access Stratum (NAS) protocol between the terminal and a Mobility Management Entity (MME) that manages the mobility of the terminal in order to enable the terminal to effectively make an emergency call using the NAS protocol and provide seamless communication even when the terminal performs handover during the emergency call in a mobile communication system.

While the following description is given in the context of a $3^{rd}$ Generation Partnership Project (3GPP) Evolved Packet System (EPS), a Universal Terrestrial Radio Access Network (UTRAN), and a GSM/EDGE Radio Access Network (GERAN) by way of example, the present invention is applicable to other communication systems using the NAS protocol. That is, methods and apparatuses for security management according to the present invention as described later can be implemented with slight modifications within the scope of the present invention in mobile communication systems having a similar technical background and channel configuration, a similar network architecture, a protocol similar to the NAS protocol, or a protocol different from the NAS protocol but operating in a similar manner to the NAS protocol.

In a description of a method for managing security for an emergency call according to the present invention, a security management procedure in the case of handover during an emergency call and a security management procedure to support an emergency call in the event of authentication failure of a terminal will be described separately.

Figure 1:
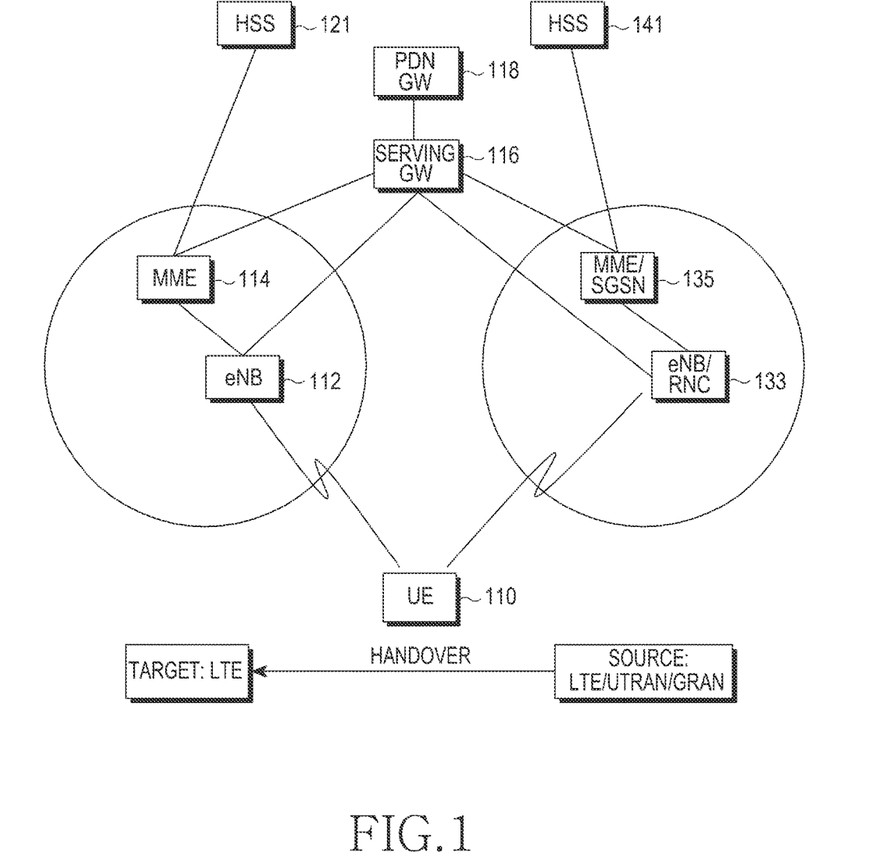
FIG. 1 is an exemplary block diagram of a mobile communication system supporting emergency calls, to which the present invention is applied.

FIG. 1 is an exemplary block diagram of a mobile communication system supporting emergency calls, to which the present invention is applied. For example, the mobile communication system is a 3GPP EPS.

Referring to FIG. 1, an evolved Node B (eNB)/Radio Network Controller (RNC) 133 establishes a wireless connection with a User Equipment (UE) 110 in its service area, that is, its cell and conducts an emergency call communication with the UE 110. The UE 110 is a terminal that accesses a Packet Data Network (PDN) such as the Internet through a Serving Gateway (serving SG or SGW) 116. Herein, a Packet Data Network Gateway (PDN GW) 118 being a network entity of the PDN serves as a Home Agent (HA). In FIG. 1, a Mobility Management Entity (MME)/Serving GPRS Support Node (SGSN) 135 manages the mobility, location, and registration of the UE 110. A Home Subscriber Server (HSS) 141 is connected to the MME/SGSN 135 via an interface, for managing authentication information and service information about users and the UE 110.

In FIG. 1, data paths and interfaces for managing the mobility of UEs exist between the eNB/RNC 133 and the serving GW 116 and between the MME/SGSN 135 and the serving GW 116. According to the present invention, the MME/SGSN 135 performs mobility management and session management by communicating with the UE 110 using a NAS protocol stack.

In the present invention, a situation in which the UE 110 connected to a source network 100a makes an emergency call and a situation in which the UE 110 performs handover during the emergency call are assumed. The source network 100a may be of a Radio Access Technology (RAT) type such as Evolved UMTS Terrestrial Radio Access Network (EUTRAN), UTRAN, GSM EDGE Radio Access Network (GERAN), etc. For convenience' sake, the embodiment of the present invention is based on the assumption that the source network 100a is a EUTRAN and a target network 100b to which the UE 110 will move supports the EUTRAN, in describing a security problem encountered with performing an emergency call. Therefore, when the UE 110 performs handover to the target network 100b, the UE 110 receives a service, while being connected to a target eNB 112, an MME 114, and an HSS 121.

As illustrated in FIG. 1, the HSSs 141 and 121 may be connected respectively to the source network 110a and the target network 110b. On the other hand, the source network 110a and the target network 110b may share a single HSS.

Now a description will be given of embodiments of the present invention for supporting handover during an emergency call in progress (hereinafter, referred to as "emergency call handover") in the mobile communication system having the configuration illustrated in FIG. 1, with reference to FIGS. 2 to 5.

Figure 2A:
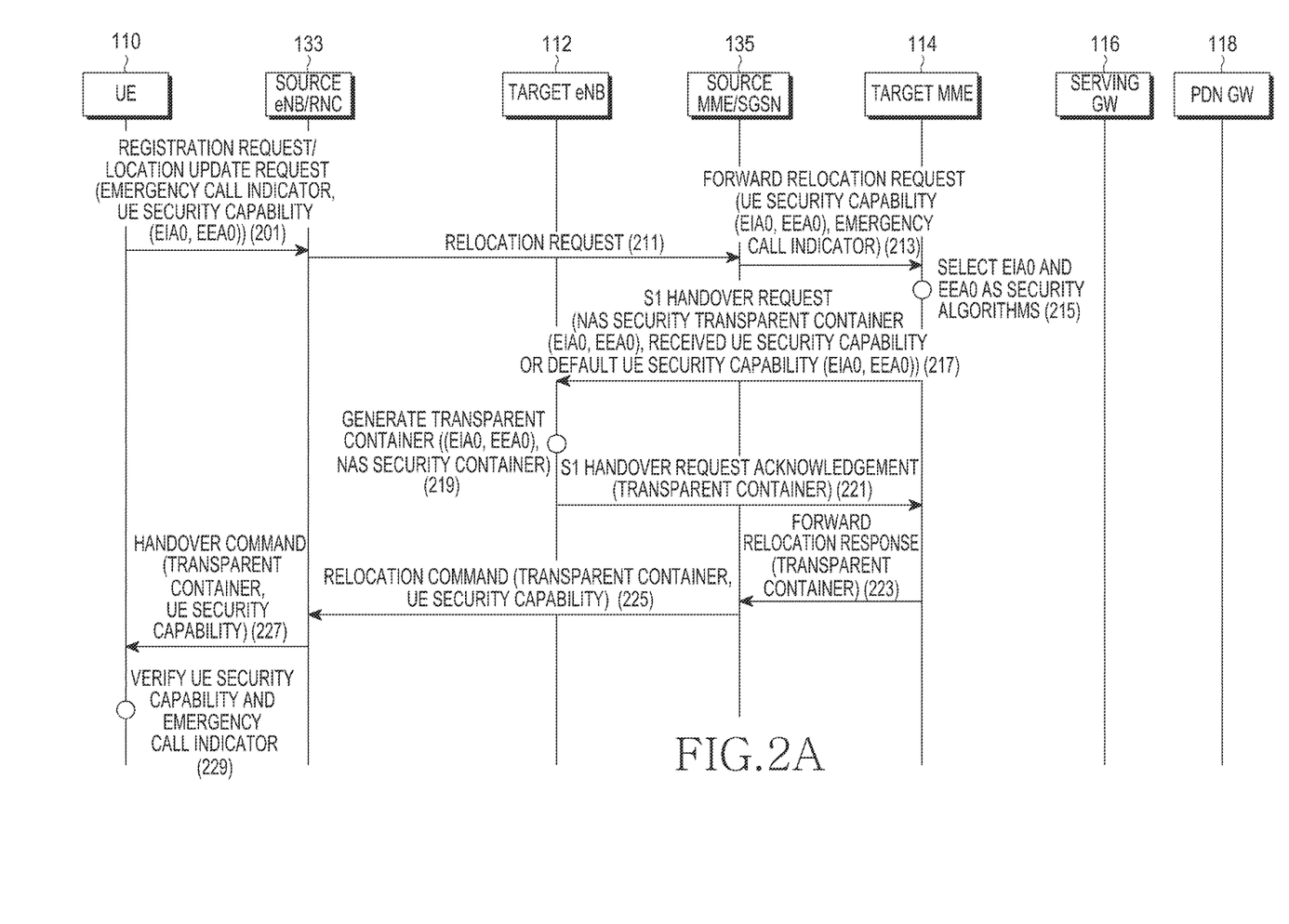
FIGS. 2a and 2b are diagrams illustrating message flows for a security procedure during handover of an emergency call according to an embodiment of the present invention.
Figure 2B:
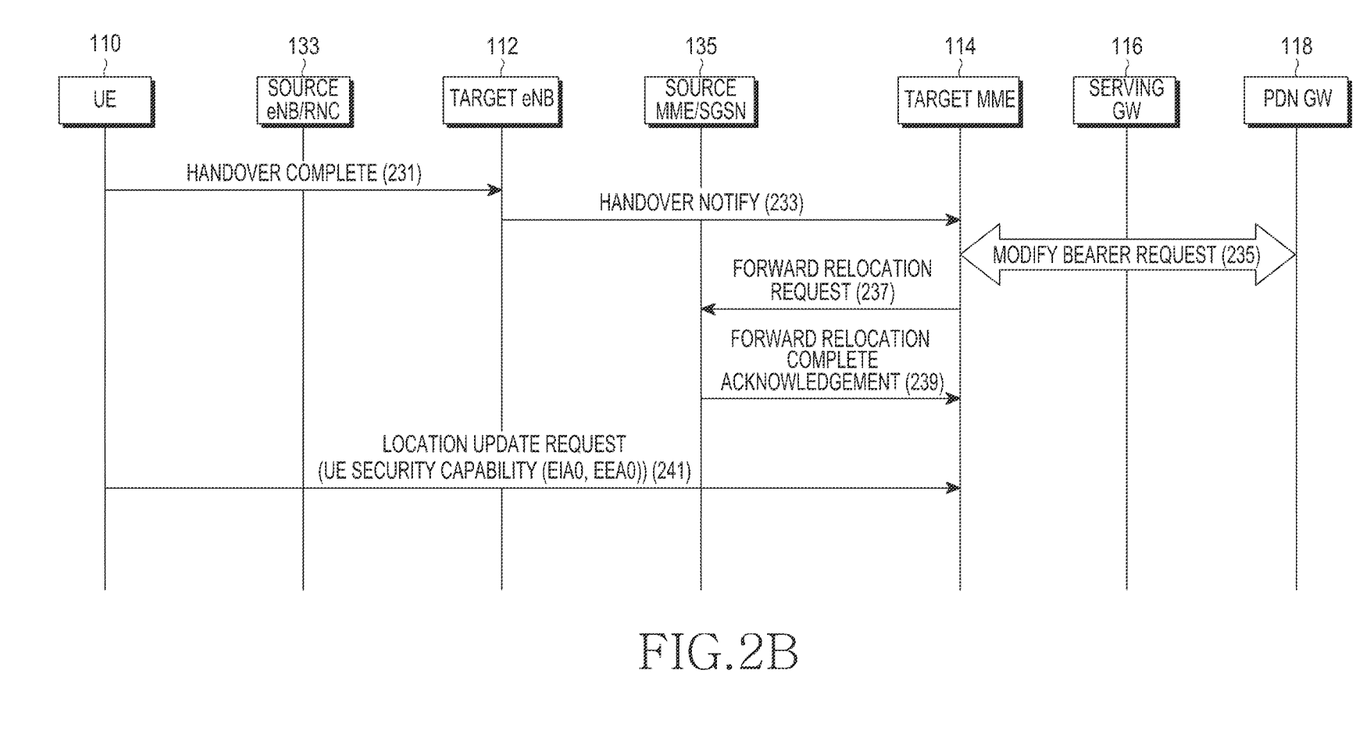

FIGS. 2a and 2b are diagrams illustrating message flows for a security procedure during emergency call handover according to an embodiment of the present invention.

Referring to FIG. 2a, the UE 110 requests registration or location update to the network in order to support an emergency call in step 201. That is, the UE 110 includes an emergency call indicator in a registration request message Attach Request or a location update request message Routing Area Update (RAU) Request or Tracking Area Update (TAU) Request and transmits the message to the source MME/SGSN 135, thus indicating a registration request or location update request for an emergency call. Inclusion of the emergency call indicator is optional.

The registration request message or the location update request message includes a UE security capability. In addition, the registration request message or the location update request message includes EPS Integrity Algorithm 0 (EIA0) as a NULL integrity algorithm and EPS Encryption Algorithm 0 (EEA0) as a NULL ciphering algorithm to support an emergency call. The subsequent procedure is divided into a handover preparation procedure and a handover implementation procedure. The handover preparation procedure is performed as follows.

The UE security capability may be included together with the emergency call indicator. Or the emergency call indicator may not be included so that the UE security capability functions as the emergency call indicator. For example, upon receipt of a registration request message or location update request message including EIA0 and EEA0 as a UE security capability from a UE, the network determines that this message indicates emergency call handover.

In FIGS. 2a and 2b, the handover preparation procedure is performed in steps 211 to 223, and the handover implementation procedure is performed in steps 225 and 241.

Handover preparation is a process of requesting resources to a core network. The handover preparation procedure involves requesting preparation of resources in the target eNB 112, the target MME 114, and the serving GW 116. The source network transmits a bearer context or a mobility management context to the target network during the handover preparation.

The following messages are transmitted in the handover preparation procedure. An eNB of the source network, namely the source eNB/RNC 133 transmits a Relocation Request message for handover preparation to a mobility manager of the source network, namely the source MME/SGSN 135 in step 211. In step 213, the source MME/SGSN 135 transmits a Forward Relocation Request message to the target MME 114. The Forward Relocation Request message transmitted to the target MME 114 by the source MME/SGSN 135 may include the UE security capability. In the case where the Forward Relocation Request message includes the UE security capability, if the UE is preparing for handover during supporting an emergency call, the Forward Relocation Request message includes at least EIA0 as a NULL integrity algorithm and EEA0 as a NULL ciphering algorithm. To indicate that the UE is making an emergency call, the Forward Relocation Request message may include an emergency call indicator.

The target MME 114 selects EIA0 and EEA0 as NAS security algorithms in step 215 and transmits an S1 Handover Request message to the target eNB 112 in step 217. "S1" is the name of an interface for communication between an eNB and an MME. Herein, the target MME 114 generates a NAS security transparent container and transmits it to the target eNB 112. The NAS security transparent container includes the NAS security algorithms that the target MME 114 has selected in step 215. If the UE is preparing for handover during an emergency call in progress, the target MME 114 generates the NAS security transparent container by including at least EIA0 and EEA0 in it. The S1 Handover Request message transmitted to the target eNB 112 by the target MME 114 in step 217 also includes the UE security capability. The UE security capability is the same as received at the target MME 114 from the source MME/SGSN 135 in step 213.

In the absence of the UE security capability in step 213, the target MME 114 includes a default security capability in the S1 handover request message. The default security capability should include at least EIA0 and EEA0 in case the UE is making an emergency call. The default security capability may include EEA0, EEA1 and EEA2 as algorithms for encrypting NAS, Radio Resource Control (RRC), and User Plane (UP) data and EIA0, EIA1 and EIA2 as NAS and RRC integrity algorithms.

In step 219, the target eNB 112 generates a transparent container. The transparent container includes EIA0 and EEA0 as RRC and UP security algorithms selected based on the afore-described UE security capability, that is, the UE EPS security capability in order to support an emergency call. The transparent container also includes the NAS transparent security container received in step 217. The target eNB 112 transmits an S1 Handover Request Acknowledgement message including the transparent container generated in step 219 to the target MME 114 in step 221. In step 223, the target MME 114 transmits a Forward Relocation Response message including the transparent container received in step 221 to the source MME/SGSN 135 in step 223. In this manner, the handover preparation procedure is performed in steps 211 to 223. In the subsequent handover implementation procedure, the source MME/SGSN 135 notifies the source eNB/RNC 133 of completed handover preparation by transmitting a Relocation Command message in step 225. The Relocation Command message may include elements such as the transparent container received from the target MME 114 by the source MME/SGSN 135 in step 223 and the UE security capability of the UE 110. The UE security capability may be set to a value included in the Attach Request message or the RAU or TAU Request message transmitted by the UE and may include EIA0 and EEA0 to support an emergency call. The UE security capability may be used for the UE 110 to verify a Handover Command message received from the source eNB/RNC in step 229. That is, the source eNB/RNC 133 issues a command requesting handover to the target eNB 112 by transmitting a Handover Command message to the UE 110 in step 227. The Handover Command message includes the transparent container and the UE security capability that the eNB/RNC 133 has received from the source MME/SGSN 135 in step 225.

In step 229, the UE 110 checks whether the source eNB/RNC 133 is a valid entity to transmit a message to the UE 110 by comparing the UE security capability set in the registration request or location update request message transmitted before the handover preparation procedure with the UE security capability received from the source eNB/RNC 133 in step 227. The UE 110 also determines whether EIA0 and EEA0 set as selected algorithms in the transparent container received from the source eNB/RNC 133 in step 227 are appropriate by checking whether an emergency call indicator was used in the registration request or location update request message before the handover preparation in step 229.

If the check turns out successful in step 229, the UE 110 performs handover to the target eNB 112 and transmits a Handover Complete message to the target eNB 112 in step 231. In step 233, the target eNB 112 transmits a Handover Notify message to the target MME 114. If the serving GW 116 has been changed, a modify bearer request procedure is performed by the target MME 116, the serving GW 116, and the PDN GW 118 in step 235. The target MME 114 transmits a Forward Relocation Complete message to the source MME/SGSN 135 to notify completed handover, thereby helping release of a bearer used in the source network in step 237. In step 239, the source MME/SGSN 135 replies to the target MME 114 with a Forward Relocation Complete Acknowledgement message.

During handover, the UE 110 transmits a TAU Request message to the target MME 114 in step 241. The TAU Request message includes a UE security capability which may include high-priority security algorithms having at least EIA0 and EEA0 to support an emergency call.

Figure 3:
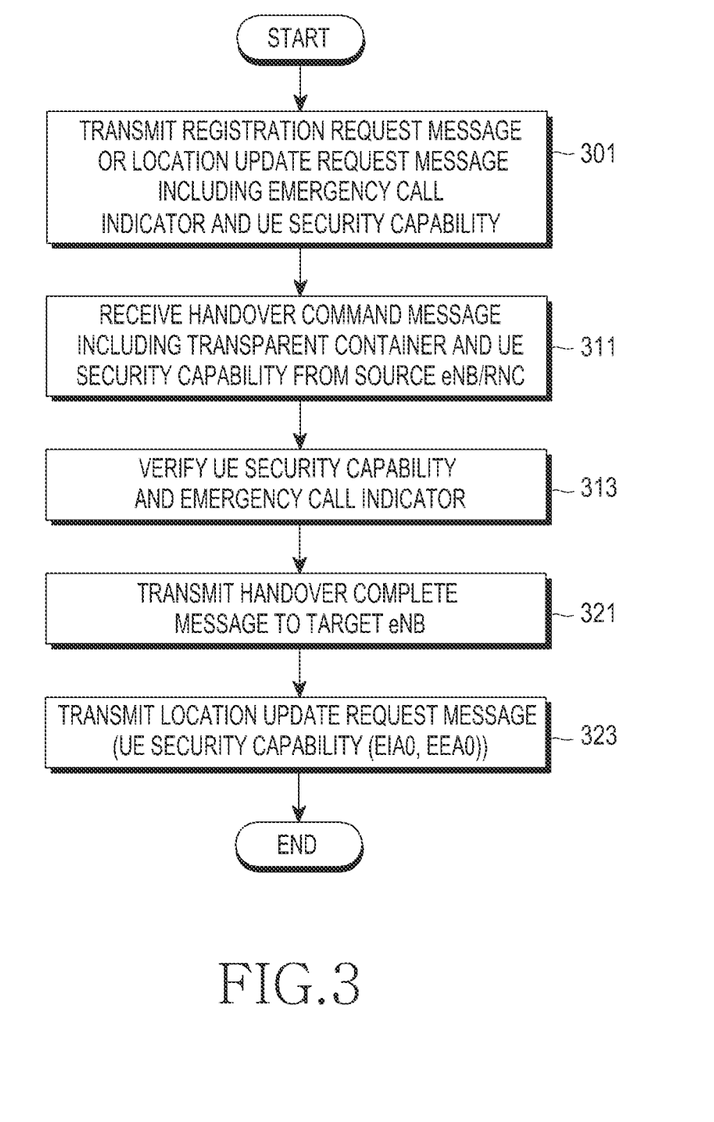
FIG. 3 is a flowchart illustrating an operation for supporting the security procedure during handover of an emergency call at a User Equipment (UE) according to an embodiment of the present invention.

FIG. 3 is a flowchart illustrating an operation for supporting the security procedure during handover of an emergency call at a UE according to an embodiment of the present invention.

Referring to FIG. 3, the UE 110 requests registration or location update to the source MME/SGSN 135 in order to support an emergency call in step 301. That is, the UE 110 notifies the source MME/SGSN 135 of a registration request or location update for an emergency call by transmitting an emergency call indicator in an Attach Request message or an RAU or TAU Request message, as described before with reference to step 201 of FIG. 2. The emergency call indicator is optional. The registration request message or the location update request message includes a UE security capability. The UE security capability includes, for example, EIA0 as an integrity algorithm and EEA0 as a ciphering algorithm to support an emergency call. A handover procedure is divided into a handover preparation procedure and a handover implementation procedure. The UE 110 is involved in the handover implementation procedure. Steps subsequent to step 311 are for the handover implementation procedure.

That is, the UE 110 receives a Handover Command message from the source eNB/RNC 133, thus being commanded to perform handover to the target eNB 112 in step 311. The Handover Command message includes a transparent container and a UE security capability received at the source eNB/RNC 133. The transparent container includes at least EIA0 and EEA0 that the target eNB 112 has selected to perform emergency call handover. The transparent container is transferred to the UE 110 through the target eNB 112, the target MME 114, the source MME/SGSN 135, and then the source eNB/RNC 133.

The UE security capability included in the Handover Command message may have a value set in the Attach Request message or the RAU Request or TAU Request message that the UE 110 transmitted. The UE security capability may include at least EIA0 and EEA0 to support an emergency call. In step 313, the UE 110 may check whether the source eNB/RNC 133 is a valid entity to transmit a message to the UE 110 by comparing the UE security capability set in the Attach Request message or the RAU Request or TAU Request message transmitted in step 301 with the UE security capability received in the Handover Command message. The UE also determines whether EIA0 and EEA0 set as selected algorithms in the transparent container are appropriate by checking whether an emergency call indicator was used in the Attach Request message or the RAU Request or TAU Request message transmitted before the handover preparation. If both the UE security capability check and the emergency call indicator check turn out successful, the UE 110 performs handover to the target eNB 112 and transmits a Handover Complete message to the target eNB 112 in step 321. During handover, the UE 110 transmits a TAU Request message to the target MME 114 in step 323. The TAU Request message includes a UE security capability which may include high-priority security algorithms having at least EIA0 and EEA0 to support an emergency call.

Figure 4:
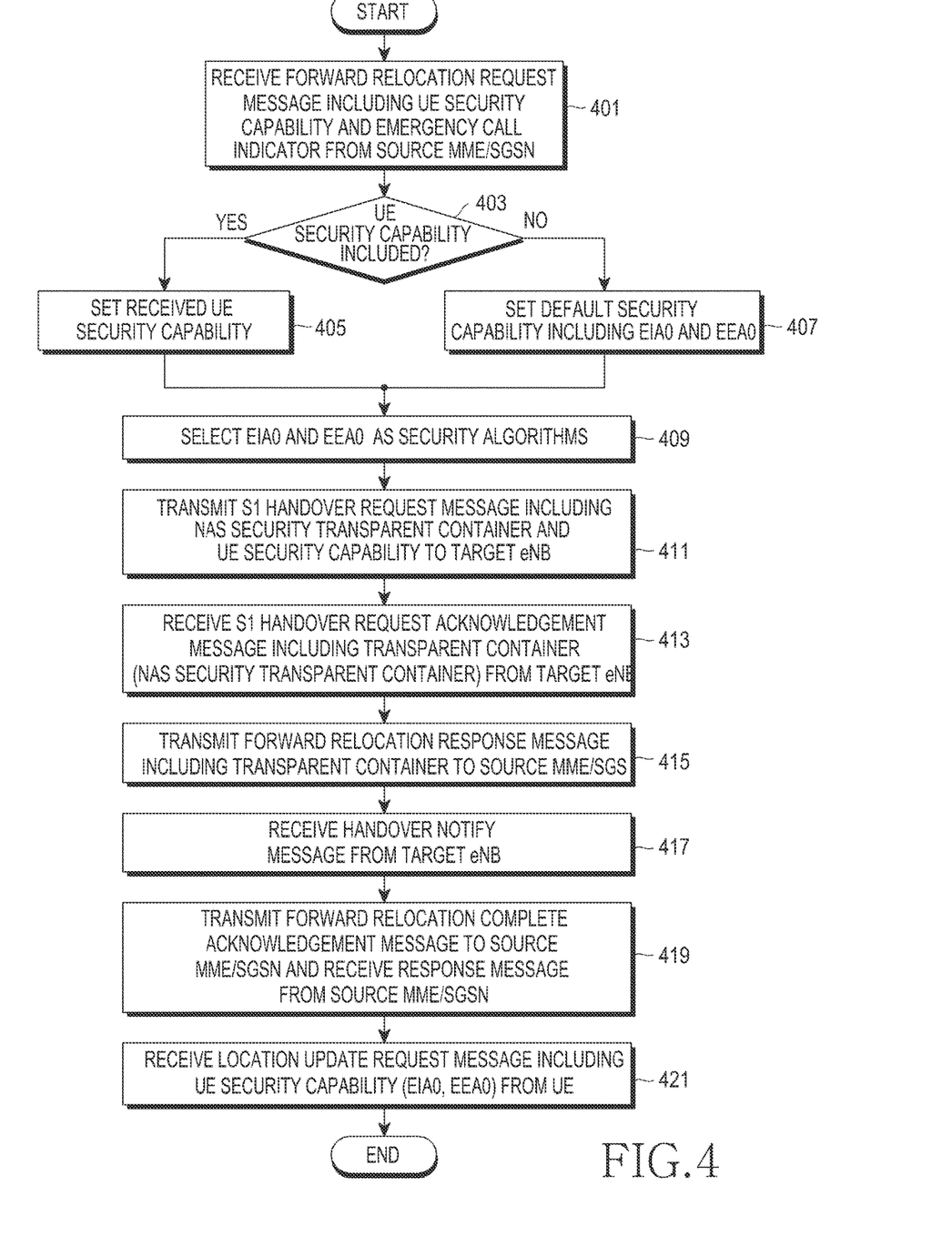
FIG. 4 is a flowchart illustrating an operation for supporting the security procedure during handover of an emergency call at a target Mobility Management Entity (MME) according to an embodiment of the present invention.

FIG. 4 is a flowchart illustrating an operation for supporting the security procedure during handover of an emergency call at a target MME according to an embodiment of the present invention.

Referring to FIG. 4, the target MME 114 receives a Forward Relocation Request message from the source MME/SGSN 135 in step 401. The Forward Relocation Request message may optionally include a UE security capability. In the case where a UE security capability is included in the Forward Relocation Request message, if the UE is preparing for handover during an emergency call, the Forward Relocation Request message should include at least the NULL integrity algorithm EIA0 and the NULL ciphering algorithm EEA0. To indicate that the UE is making an emergency call, the Forward Relocation Request message may include an emergency call indicator.

In the presence of a UE security capability in the Forward Relocation Request message in step 403, the target MME 114 uses the UE EPS security capability received from the source MME/SGSN 135 in step 405. On the contrary, in the absence of a UE security capability in the Forward Relocation Request message received from the source MME/SGSN 135 in step 403, the target MME 114 sets a default UE EPS security capability to include at least EIA0 and EEA0 as security algorithms in step 407. Subsequently, the target MME 114 selects EIA0 and EEA0 as NAS security algorithms in step 409.

The target MME 114 transmits an S1 Handover Request message to the target eNB 112 in step 411. Herein, the target MME 114 generates and transmits a NAS security transparent container. The NAS security transparent container includes the security algorithms selected in step 409. If the UE is making an emergency call at the moment of handover preparation, the target MME 114 includes at least EIA0 and EEA0 in the NAS security transparent container.

In addition, the S1 Handover Request message includes a UE security capability. The UE security capability is identical to the UE security capability received from the source MME/SGSN 135 or the default security capability in the absence of the UE security capability received from the source MME/SGSN 135. The UE security capability includes at least EIA0 and EEA0 in case the UE is making an emergency call. The UE security capability may include EEA0, EEA1 and EEA2 as NAS, RRC, and UP ciphering algorithms and EIA0, EIA1 and EIA2 as NAS and RRC integrity algorithms.

In step 413, the target MME 114 receives an S1 Handover Request Acknowledgement message including a transparent container generated by the target eNB 112. The transparent container includes at least EIA0 and EEA0 for supporting an emergency call as RRC and UP security algorithms selected based on the UE security capability. The S1 Handover Request Acknowledgement message includes the NAS security transparent container that the target MME 114 generated and transmitted to the target eNB 112 in step 411.

In step 415, the target MME 114 transmits a Forward Relocation Response message including the transparent container received from the target eNB 112 in step 413 to the source MME/SGSN 135. When the UE 110 performs handover to the target eNB 112, the target MME 114 receives a Handover Notify message from the target eNB 112 in step 417. Subsequently, the target MME 114 transmits a Forward Relocation Complete message indicating completed handover to the source MME/SGSN 135 in order to help release of a bearer used in the source network and receives a Forward Relocation Complete Acknowledgement message from the source MME/SGSN 135 in response to the Forward Relocation Complete message in step 419.

In step 421, the target MME 114 receives a TAU Request message from the UE 110. The TAU Request message includes a UE security capability which may include high-priority security algorithms including at least EIA0 and EEA0 to support an emergency call.

Figure 5:
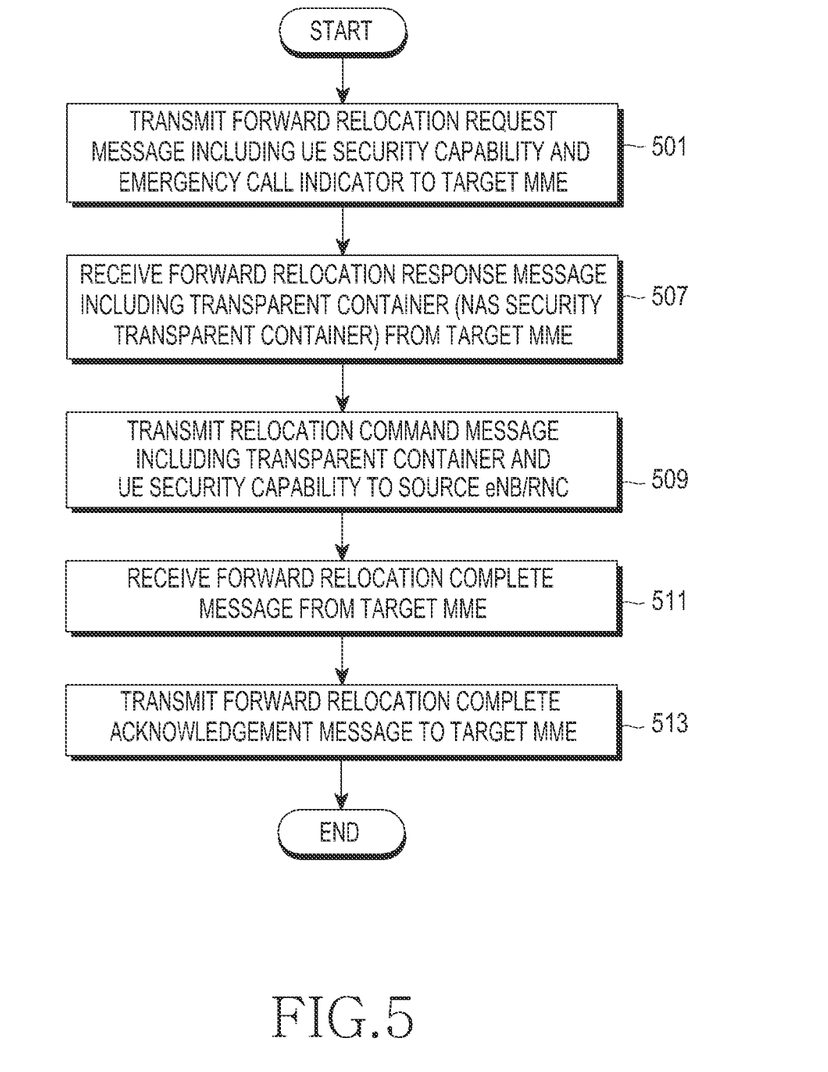
FIG. 5 is a flowchart illustrating an operation for supporting the security procedure during handover of an emergency call at a source MME/Serving GPRS Support Node (SGSN) according to an embodiment of the present invention.

FIG. 5 is a flowchart illustrating an operation for supporting the security procedure during handover of an emergency call at a source MME/SGSN according to an embodiment of the present invention.

Referring to FIG. 5, the source MME/SGSN 135 transmits a Forward Relocation Request message to the target MME 114 in step 501. The Forward Relocation Request message includes a UE security capability and an emergency call indicator. Inclusion of the UE security capability is optional. If the UE security capability is included in the Forward Relocation Request message and the UE is making an emergency call, the Forward Relocation Request message includes at least EIA0 and EEA0.

In step 507, the source MME/SGSN 135 receives a Forward Relocation Response message including a transparent container from the target MME 114. The source MME/SGSN 135 notifies the source eNB/RNC 133 of completed handover preparation by transmitting a Relocation Command message in step 509. The Relocation Command message includes the transparent container and a UE security capability received from the target MME 114 in step 507. The UE security capability may have a value set in an Attach Request message or an RAU Request or TAU Request message that the UE has transmitted. The UE security capability includes at least EIA0 and EEA0 to support an emergency call. The UE security capability may be used for the UE 110 to check a Handover Command message received from the source eNB/RNC 133. In step 511, the source MME/SGSN 135 receives a Forward Relocation Complete message for helping release of a bearer used in the source network from the target MME 114. The Forward Relocation Complete message indicates completion of the handover procedure. The source MME/SGSN 135 transmits a Forward Relocation Complete Acknowledgement message to the target MME 114 in response to the Forward Relocation Complete message in step 513.

Figure 6:
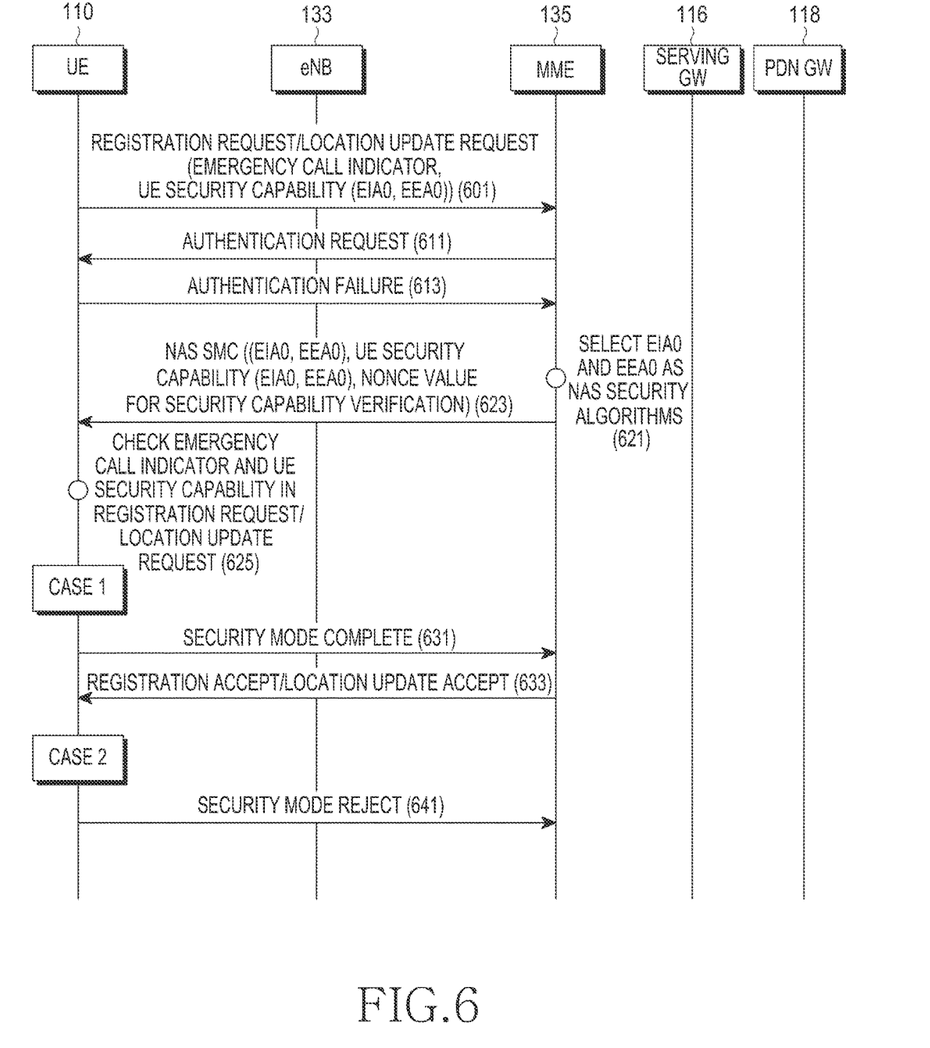
FIG. 6 is a diagram illustrating a message flow for a security management procedure to support an emergency call in the event of authentication failure of a UE according to another embodiment of the present invention.
Figure 7:
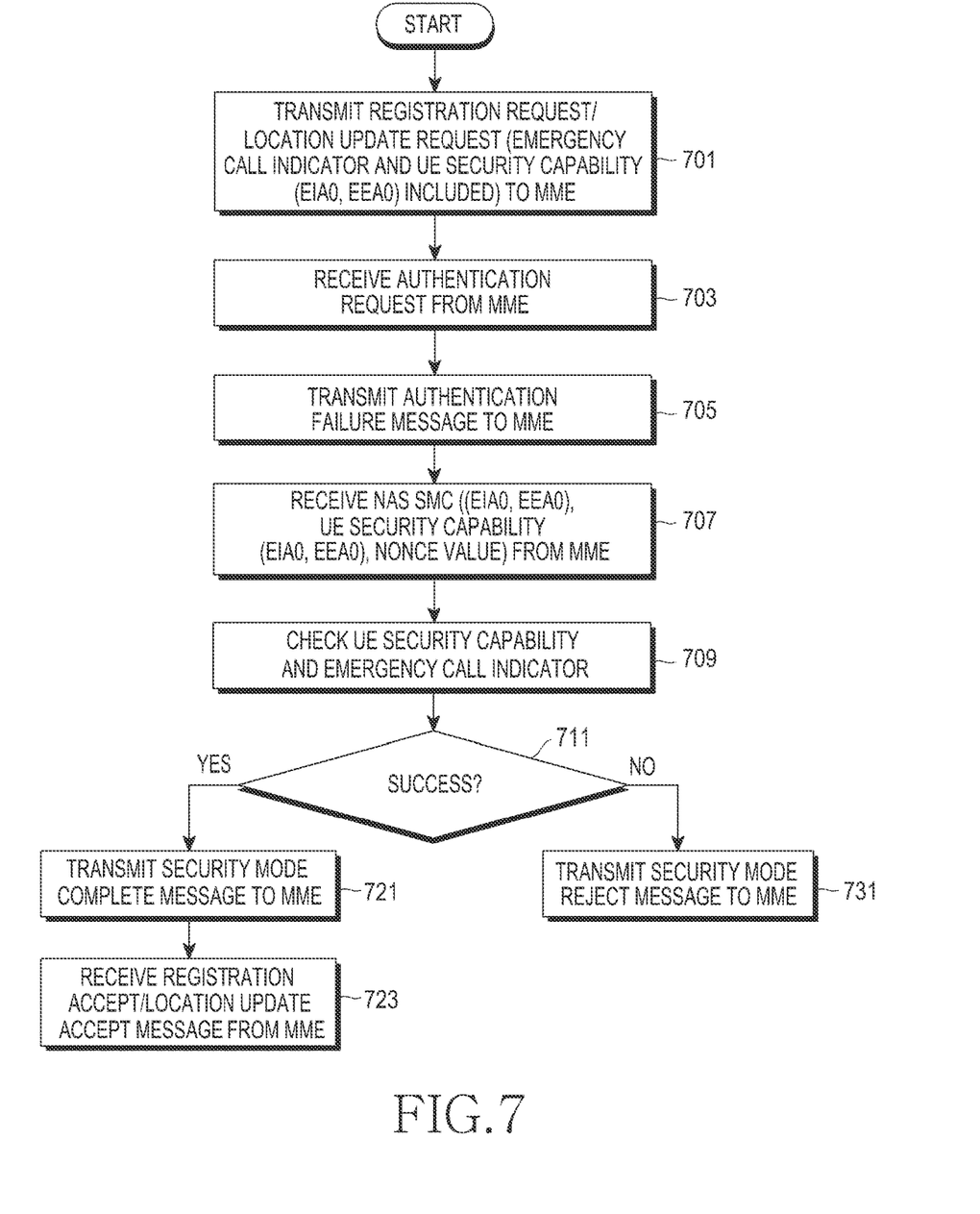
FIG. 7 is a flowchart illustrating a security management procedure to support an emergency call at a UE according to another embodiment of the present invention.
Figure 8:
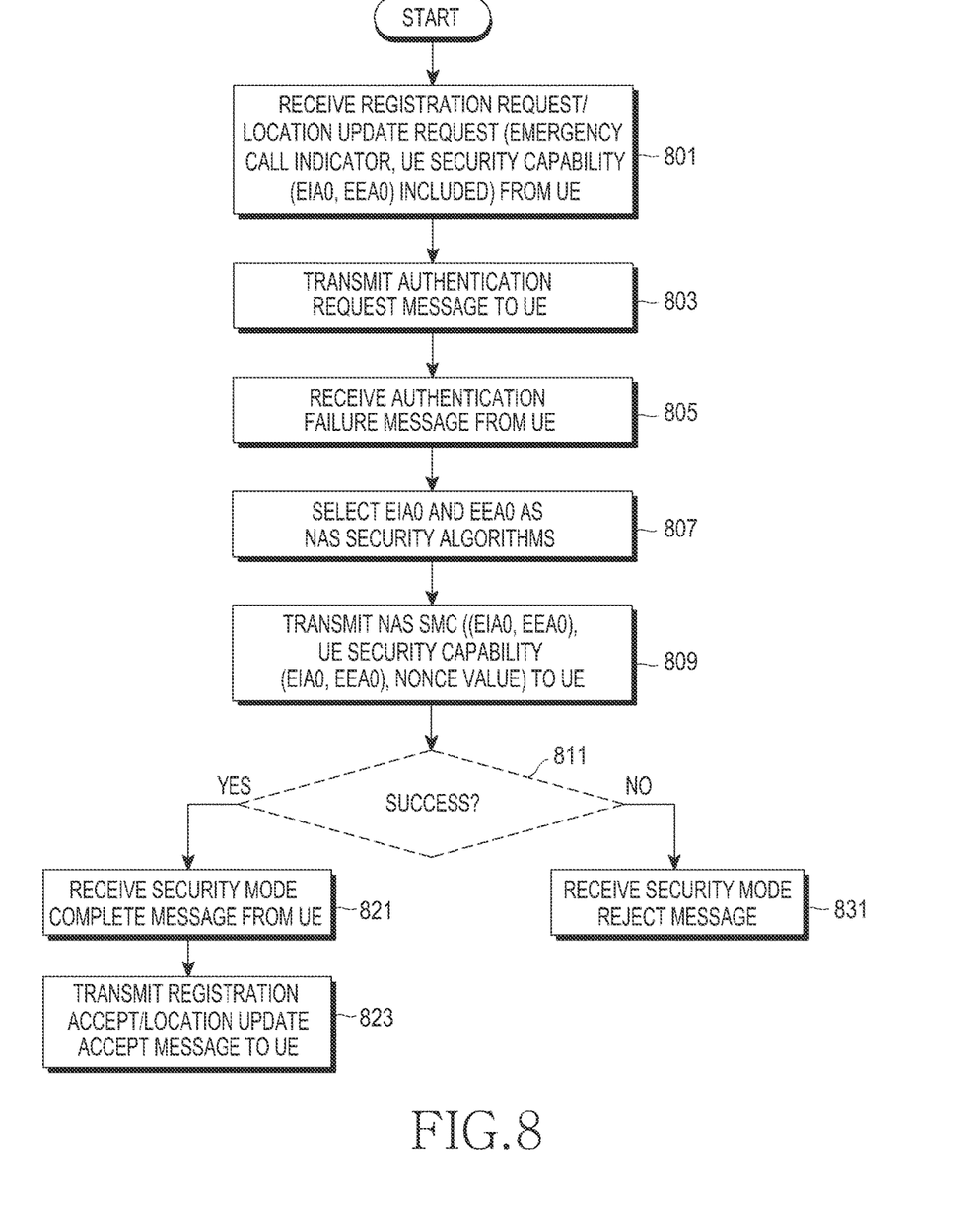
FIG. 8 is a flowchart illustrating a security management procedure to support an emergency call at an MME according to another embodiment of the present invention.

With reference to FIGS. 6, 7 and 8, a method for supporting an emergency call in the event of authentication failure of a UE according to an embodiment of the present invention will be described below.

FIG. 6 is a diagram illustrating a message flow for a security management procedure to support an emergency call in the event of authentication failure of a UE according to another embodiment of the present invention.

Referring to FIG. 6, the UE 110 transmits an Attach Request message or a TAU Request message to the MME 135 in step 601. The Attach Request message or the TAU Request message includes a UE security capability and an emergency call indicator. The UE security capability includes at least EIA0 as a NULL integrity algorithm and EEA0 as a NULL ciphering algorithm in order to support an emergency call situation. In accordance with the embodiment of the present invention, the Attach Request message or the TAU Request message further includes a NONCE value for verification to prevent an attack from an attacker other than a person authorized to transmit and receive messages, that is, a man-in-the middle attack. The UE 110 may verify a network entity that transmits a UE security capability using the NONCE value in step 625.

In another embodiment of the present invention, a bit of the UE security capability may be used to prevent the man-in-the-middle attack. For example, an eighth bit of octet 6 or octet 7 in a UE security capability IE is included in the Attach Request message or the TAU Request message that the UE 110 transmits to the MME 135. Later, the UE may check a man-in-the-middle attack by comparing the bit with a bit set in a UE security capability received from the MME 135.

Specifically, the MME 135 transmits an Authentication Request message to the UE 110 in step 611. If the UE 110 fails in verifying the Authentication Request message, the UE 110 transmits an Authentication Failure message to the MME 135 in step 613. While the UE 110 may succeed in the authentication, an operation in case of authentication failure will be described because the embodiment of the present invention is related to a security management procedure to support an emergency call in the event of authentication failure. The MME 135 selects algorithms including EIA0 for integrity and EEA0 for ciphering as NAS security algorithms in step 621 and transmits a NAS Security Mode Command (NAS SMC) message to the UE 110 in step 623. The NAS SMC message includes a UE security capability as well as EIA0 and EEA0 as the algorithms selected in step 621, in order to identify a man-in-the-middle attack. Herein, at least EIA0 and EEA0 are included. As described before, if the UE 110 has transmitted a NONCE value to verify a UE security capability to thereby determine a man-in-the-middle attack, the MME 135 may repeatedly transmit the NONCE value. Or if the UE 110 has transmitted a part of bit values of the UE security capability IE (e.g. an eighth bit of octet 6 or octet 7), the MME 135 may repeatedly transmit the bit. Thus, the UE 110 may use the NONCE value or bit value in verification.

In step 625, the UE 110 checks whether the Attach Request message or the TAU Request message transmitted in step 601 includes an emergency call indicator. When the UE 110 has been making an emergency call and has transmitted a security capability verification bit of the UE security capability or a NONCE value for verifying the UE security capability, the UE 110 may determine whether there is a man-in-the middle attack by comparing the NONCE value transmitted in step 601 with the NONCE value received in step 623. If the two NONCE values are identical, the UE 110 determines that there is no man-in-the-middle attack.

If no emergency call has been made or an SMC with a value other than EIA0 and EEA0 has been requested for an emergency call of the authentication-failed UE in step 625, that is, in the case of authentication failure in step 625, the UE 110 proceeds to case 2 of FIG. 6. Then the UE 110 transmits a Security Mode Reject message with a cause set to unspecified security mode failure (e.g. code 24) to the MME 135 in step 641. On the contrary, if the verification turns out successful in step 625, the UE 110 proceeds to case 1 of FIG. 6. Then the UE 110 transmits a Security Mode Complete message to the MME 135 in step 631, and receives an Attach Accept/TAU Accept message from the MME 135 in step 633.

FIG. 7 is a flowchart illustrating a security management procedure to support an emergency call at a UE according to another embodiment of the present invention. Referring to FIG. 7, the UE 110 transmits an Attach Request message or a TAU Request message to the MME 135 in step 701. The UE 110 includes a UE security capability and an emergency call indicator in the Attach Request message or the TAU Request message. The UE security capability includes at least EIA0 as a NULL integrity algorithm and EEA0 as a NULL ciphering algorithm in order to support an emergency call situation. In addition, the UE 110 adds a NONCE value for the situation of EIA0 and EEA0 to enable verification of a network entity that transmits a UE security capability as well as to identify a man-in-the-middle attack using the UE security capability in step 709. Or a bit of the UE security capability may be used. For example, the UE 110 transmits an eighth bit of octet 6 or octet 7 of the UE security capability IE to the MME 135 in the Attach Request message or the TAU Request message. Thus, the UE may identify a man-in-the-middle attack by comparing the transmitted bit value with a later-received bit value.

In step 703, the UE 110 receives an Authentication Request message from the MME 135. If the UE 110 fails in verifying the Authentication Request message, the UE 110 transmits an Authentication Failure message to the MME 135 in step 705. A description of the embodiment of the present invention focuses on a procedure subsequent to authentication failure. In step 707, the UE 110 receives a NAS SMC message from the MME 135. The NAS SMC message includes a UE security capability as well as EIA0 and EEA0 as the algorithms selected in step 621 of FIG. 6, in order to identify a man-in-the-middle attack. Herein, the NAS SMC message includes at least EIA0 and EEA0. As described before, if the UE 110 has transmitted a NONCE value to verify a UE security capability to thereby determine a man-in-the-middle attack, the UE 110 may receive the NONCE value repeatedly. Or if the UE 110 has transmitted a part of bit values of the UE security capability (e.g. an eighth bit of octet 6 or octet 7), the UE 110 may receive the bit repeatedly. Thus, the UE 110 may use the NONCE value or bit value in verification.

In step 709, the UE 110 checks whether the Attach Request message or the TAU Request message includes an emergency call indicator. When the UE 110 has been making an emergency call and has transmitted a security capability verification bit of the UE security capability or a NONCE value for verifying the UE security capability, the UE 110 may determine whether there is a man-in-the middle attack by comparing the NONCE values. If no emergency call has been made or an SMC with a value other than EIA0 and EEA0 has been requested for an emergency call of the authentication-failed UE in step 711, that is, in the case of authentication failure in step 711, in other words, in the case 2 of FIG. 6, the UE 110 transmits a Security Mode Reject message with a cause set to unspecified security mode failure (e.g. code 24) to the MME 135 in step 731. On the contrary, if the verification turns out successful, the UE 110 transmits a Security Mode Complete message to the MME 135 in step 721, as in case 1 of FIG. 6, and receives an Attach Accept/TAU Accept message from the MME 135 in step 723.

FIG. 8 is a flowchart illustrating a security management procedure to support an emergency call at an MME according to another embodiment of the present invention.

Referring to FIG. 8, the MME 135 receives an Attach Request message or a TAU Request message from the UE 110 in step 801. The Attach Request message or the TAU Request message includes a UE security capability and an emergency call indicator. The UE security capability includes at least EIA0 as a NULL integrity algorithm and EEA0 as a NULL ciphering algorithm in order to support an emergency call situation.

In step 803, the MME 135 transmits an Authentication Request message to the UE 110. If the UE 110 fails in verifying the Authentication Request message, the MME 135 receives an Authentication Failure message from the UE 110 in step 805. The embodiment of the present invention will be described, focusing on the subsequent procedure after the authentication failure.

The MME 135 selects algorithms including EIA0 for integrity and EEA0 for ciphering as NAS security algorithms in step 807 and transmits a NAS SMC message to the UE 110 in step 809. Besides the selected algorithms EIA0 and EEA0, the NAS SMC message repeatedly carries a UE security capability received from the UE 110 for the purpose of identifying a man-in-the-middle attack. If the MME 135 has received a NONCE value for security capability verification from the UE 110 to identify a man-in-the-middle attack, the MME 135 repeatedly transmits the NONC value. If the MME 135 has received a partial bit value of the UE security capability from the UE 110, the MME 135 may repeatedly transmit the bit value so that the UE 110 may use the bit value for later verification.

In step 811, the UE 110 checks whether the Attach Request message or the TAU Request message includes an emergency call indicator. When the UE 110 has been making an emergency call and has transmitted a security capability verification bit of the UE security capability or a NONCE value for verifying the UE security capability, the UE 110 may determine whether there is a man-in-the middle attack by comparing the NONCE values. The verification of step 811 is performed by the UE 110. The MME 135 receives a Security Mode Reject message or a Security Mode Complete message from the UE 110 according to the verification result, as follows.

That is, if no emergency call has been made or an SMC with a value other than EIA0 and EEA0 has been requested for an emergency call of the authentication-failed UE in step 811, that is, in case 2 of FIG. 6, the MME 135 receives a Security Mode Reject message with a cause set to unspecified security mode failure (e.g. code 24) from the UE 110. On the contrary, if the verification turns out successful in step 811, the MME 135 receives a Security Mode Complete message from the UE 110 in step 821, as in case 1 of FIG. 6. Then the MME 135 transmits an Attach Accept/TAU Accept message to the UE 110 in step 823.

In the above-described embodiments of the present invention, each of the UE and the MME may be configured so as to include a message generator for generating messages according to the methods described before with reference to FIGS. 2 to 8, a transceiver for transmitting and receiving messages over a wireless network, and a controller for controlling an overall security management procedure for emergency call handover and a security management procedure supporting an emergency call in the event of authentication failure based on the transmitted and received messages.

In the case where Layer 2 (L2) supports an Access Stratum (AS) protocol and a NAS protocol in an evolved mobile communication system such as a 3GPP EPS, when a UE performs handover during an emergency call in progress, for example, when a UE performs handover from one EUTRAN to another EUTRAN or from a network of a different RAT such as UTRAN or GERAN to a EUTRAN during an emergency call in progress, the present invention enables authentication, use of secure NAS messages, and seamless communication between the UE and the network.

In addition, since the present invention specifies a security operation during an emergency call and an emergency call handover operation, using a NAS protocol between a UE and an MME, the present invention can authenticate the UE using the NAS protocol, support security management between the UE and a network entity for managing mobility in the corresponding RAT such as the MME, and provide a seamless communication service, even when the UE moves from a 3GPP EPS to a EUTRAN or from a network of a heterogeneous RAT such as UTRAN or EUTRAN to a EUTRAN.

The present invention can handle security problems encountered with an emergency call or emergency call handover that a UE is performing, using the NAS protocol in a mobile communication system. For this purpose, the present invention supports an emergency call during authentication between a UE and a network, after the authentication, or during executing a NAS SMC set for protocol security between the UE and an MME separately from the authentication. Accordingly, the UE can perform authentication and an SMC with the network. Even when the UE performs handover during an emergency call, communication interruptions caused by authentication and security problems can be prevented.

The invention claimed is:

1. A method for managing security in a mobile communication system supporting an emergency call, the method comprising:
   determining, by a mobility management entity (MME), whether or not a user equipment (UE) performs a handover procedure from a source network to a target network during the emergency call; and
   transmitting, by the MME, a message including a security capability related to the emergency call to the source network, if the UE performs the handover procedure from the source network to the target network during the emergency call,
   wherein the security capability related to the emergency call includes evolved packet system (EPS) integrity algorithm 0 (EIA0) as an integrity algorithm and EPS encryption algorithm 0 (EEA0) as a security algorithm,
   wherein the security capability related to the emergency call is included in a non access stratum (NAS) security transparent container, and
   wherein the security capability related to the emergency call is used in a location update procedure of the UE after the handover procedure is completed.

2. The method of claim 1, wherein the security capability related to the emergency call is provided by the MME using a predefined security capability.

3. The method of claim 1, wherein the security capability related to the emergency call is provided to the MME by the UE.

4. A mobility management entity (MME) for managing security in a mobile communication system supporting an emergency call, the MME comprising:
   a communication interface configured to communicate with another network entity; and
   a processor configured to control operations of determining whether or not a user equipment (UE) performs a handover procedure from a source network to a target network during the emergency call, and transmitting a message including a security capability related to the emergency call to the source network, if the UE performs the handover procedure from the source network to the target network during the emergency call,
   wherein the security capability related to the emergency call includes evolved packet system (EPS) integrity algorithm 0 (EIA0) as an integrity algorithm and EPS encryption algorithm 0 (EEA0) as a security algorithm,
   wherein the security capability related to the emergency call is included in a non access stratum (NAS) security transparent container, and
   wherein the security capability related to the emergency call is used in a location update procedure of the UE after the handover procedure is completed.

5. The MME of claim 4, wherein the security capability related to the emergency call is provided by the MME using a predefined security capability.

6. The MME of claim 4, wherein the security capability related to the emergency call is provided to the MME by the UE.

* * * * *